(12) United States Patent
Sao et al.

(10) Patent No.: US 8,992,678 B2
(45) Date of Patent: Mar. 31, 2015

(54) INK SET FOR INK JET RECORDING AND INK JET RECORDING METHOD

(71) Applicant: Seiko Epson Corporation, Tokyo (JP)

(72) Inventors: Akihito Sao, Matsumoto (JP); Makoto Nagase, Shiojiri (JP); Kenichiro Kubota, Shiojiri (JP)

(73) Assignee: Seiko Epson Corporation (JP)

( * ) Notice: Subject to any disclaimer, the term of this patent is extended or adjusted under 35 U.S.C. 154(b) by 73 days.

(21) Appl. No.: 13/851,510

(22) Filed: Mar. 27, 2013

(65) Prior Publication Data

US 2013/0286117 A1 Oct. 31, 2013

(30) Foreign Application Priority Data

Apr. 26, 2012 (JP) .................................. 2012-100783

(51) Int. Cl.
  *C09D 11/02* (2014.01)
  *C09D 11/30* (2014.01)
  *B41J 2/21* (2006.01)

(52) U.S. Cl.
  CPC ............... *C09D 11/30* (2013.01); *B41J 2/2107* (2013.01)
  USPC ..................... 106/31.75; 106/31.86; 106/31.9

(58) Field of Classification Search
  CPC .... C09D 11/322; C09D 11/324; C09D 11/38; C09D 11/40; B41J 2/21
  USPC ........... 106/31.6, 31.75, 31.86, 31.9; 347/100
  See application file for complete search history.

(56) References Cited

U.S. PATENT DOCUMENTS

| | | | | |
|---|---|---|---|---|
| 7,156,909 | B2 * | 1/2007 | Oyanagi et al. | 106/31.86 |
| 7,513,945 | B2 * | 4/2009 | Nakano et al. | 106/31.6 |
| 7,581,829 | B2 * | 9/2009 | Oyanagi et al. | 347/100 |
| 7,604,693 | B2 * | 10/2009 | Oyanagi et al. | 106/31.6 |
| 7,763,108 | B2 * | 7/2010 | Oyanagi et al. | 106/31.86 |
| 7,846,246 | B2 * | 12/2010 | Oyanagi et al. | 106/31.6 |
| 2004/0266907 | A1 * | 12/2004 | Sugita et al. | 106/31.86 |
| 2008/0081119 | A1 * | 4/2008 | Oyanagi et al. | 427/385.5 |
| 2008/0098928 | A1 * | 5/2008 | Oyanagi et al. | 106/31.13 |
| 2008/0173214 | A1 * | 7/2008 | Oyanagi et al. | 106/31.25 |
| 2009/0162569 | A1 | 6/2009 | Morohoshi et al. | |
| 2011/0292141 | A1 * | 12/2011 | Sao et al. | 106/31.86 |
| 2012/0056929 | A1 * | 3/2012 | Sao et al. | 347/20 |
| 2012/0249666 | A1 * | 10/2012 | Maki et al. | 106/31.75 |
| 2013/0120492 | A1 * | 5/2013 | Kubota et al. | 347/20 |
| 2013/0194343 | A1 * | 8/2013 | Yokohama et al. | 347/20 |
| 2013/0194362 | A1 * | 8/2013 | Sao et al. | 106/31.75 |

FOREIGN PATENT DOCUMENTS

| | | | |
|---|---|---|---|
| JP | 2005200469 A | | 7/2005 |
| JP | 2007/146002 | * | 6/2007 |
| JP | 2008101192 A | | 5/2008 |
| JP | 2010/180332 | * | 8/2010 |

OTHER PUBLICATIONS

English translation of JP 2010/180332; Aug. 2010.*
English translation of JP 2007/146002; Jun. 2007.*

* cited by examiner

*Primary Examiner* — Helene Klemanski
(74) *Attorney, Agent, or Firm* — Harness, Dickey & Pierce, P.L.C.

(57) ABSTRACT

An ink set for ink jet recording is provided, the ink set containing a first ink which contains a first pigment and a second ink which contains a second pigment, wherein each of the first and second inks contains polyester-modified polydialkylsiloxane.

10 Claims, No Drawings

INK SET FOR INK JET RECORDING AND INK JET RECORDING METHOD

The entire disclosure of Japanese Application No. 2012-100783 filed on Apr. 26, 2012 is expressly incorporated by reference herein.

BACKGROUND

1. Technical Field

The present invention relates to an ink set for ink jet recording and an ink jet recording method involving use of such an ink set.

2. Related Art

Ink jet recording methods have been typically known, in which fine ink droplets are ejected from nozzles of an ink jet recording head to record images and characters on recording media having water absorbability, such as paper.

There has been a demand for an ink composition which enables recording on recording media having water absorbability, such as paper, as well as recording media having no or low ink absorbability, such as printing paper, synthetic paper, and films, with an ink jet recording apparatus. In order to satisfy such a demand, some ink compositions which enable recording on recording media having no or low ink absorbability have been proposed (e.g., see JP-A-2005-200469 and JP-A-2008-101192).

Such ink compositions are, however, only intended to be used alone and not intended to be used in combination with an ink that serves to form an undercoat used for hiding the colors of recording media having low absorbability or for imparting glitter to images to be recorded.

In particular, in the case where images are formed with a first ink used for forming an undercoat and a second ink that is different from the first ink, formed images may have irregularity and unsatisfactory abrasion resistance.

SUMMARY

An advantage of some aspects of the invention is that it provides an ink set for ink jet recording, the ink set being able to be suitably used for recording particularly on recording media having low absorbability. Another advantage of some aspects of the invention is that it provides an ink jet recording method involving use of such an ink set.

The invention has the following aspects and applications.

A first aspect of the invention provides an ink set for ink jet recording, the ink set including a first ink containing a first pigment and a second ink containing a second pigment, wherein each of the first and second inks contains polyester-modified polydialkylsiloxane.

It is preferable that each of the first and second inks be a non-aqueous ink.

It is preferable that the first pigment be a white pigment or a glitter pigment and that the second pigment be carbon black or an organic pigment.

It is preferable that at least one of the polyester-modified polydialkylsiloxane contained in the first ink and the polyester-modified polydialkylsiloxane contained in the second ink contain a hydroxyl group.

In this case, at least one of the first and second inks contains a heterocyclic compound or an amide compound represented by the following general formula (1),

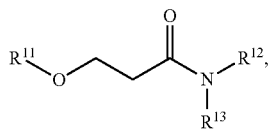

(1)

wherein $R^{11}$ represents an alkyl group having 1 to 4 carbon atoms, and $R^{12}$ and $R^{13}$ each represent a methyl group or an ethyl group.

In this case, at least one of the first and second inks contains a dicarboxylic acid dialkyl ester represented by the following general formula (2) or a polyoxyalkylene glycol compound represented by the following general formula (3),

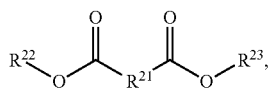

(2)

wherein $R^{21}$ represents an alkylene group having 2 to 5 carbon atoms, and $R^{22}$ and $R^{23}$ each independently represent an alkyl group having 1 to 4 carbon atoms, $$R^{32}-(OR^{31})_n-O-R^{33} \quad (3)$$

wherein $R^{11}$ represents an alkylene group having 2 or 3 carbon atoms, $R^{32}$ and $R^{33}$ each independently represent a hydrogen atom or an alkyl group having 1 to 6 carbon atoms, and n is an integer from 2 to 6.

In this case, the polyoxyalkylene glycol compound represented by the general formula (3) is a diethylene glycol compound represented by the following general formula (4) or a dipropylene glycol compound represented by the following general formula (5), $$R^{34}-(OC_2H_4)_2-O-R^{35} \quad (4)$$

wherein $R^{34}$ and $R^{35}$ each independently represent a hydrogen atom, an alkyl group having 1 to 4 carbon atoms, or an $R^{36}CO$ group, and $R^{36}$ is an alkyl group having 1 to 4 carbon atoms, $$R^{37}-(OC_3H_6)_2-O-R^{38} \quad (5)$$

wherein $R^{37}$ and $R^{38}$ each independently represent a hydrogen atom, an alkyl group having 1 to 4 carbon atoms, or an $R^{39}CO$ group, and $R^{39}$ is an alkyl group having 1 to 4 carbon atoms.

A second aspect of the invention provides a recording method involving use of the above-mentioned ink set for ink jet recording, the method including ejecting the first ink and ejecting the second ink.

DESCRIPTION OF EXEMPLARY EMBODIMENTS

Preferred embodiments of the invention will now be described. Each embodiment described below is illustrative of the invention. The invention is not limited to the embodiments described below and includes a variety of modifications without departing from the scope of the invention.

1. Ink Set for Ink Jet Recording

An ink set for ink jet recording according to an embodiment of the invention includes multiple inks; in particular, the ink set includes a first ink containing a first colorant and a second ink containing a second colorant, wherein each of the first and second inks contains polyester-modified polydialkylsiloxane.

Components contained in the ink set for ink jet recording (hereinafter simply referred to as "ink set") according to the present embodiment will now be described in detail. The term "ink" to be used alone refers to both the first and second inks according to the present embodiment.

1. 1. Pigment

The ink according to the present embodiment can contain inorganic or organic pigments generally used for existing inks. Such pigments may be used alone or in combination of two or more.

Examples of the inorganic pigments include metals such as aluminum, silver, gold, platinum, cobalt, iron, chromium, copper, zinc, lead, titanium, vanadium, manganese, and nickel; pearl pigments; metal oxides such as titanium oxide; sulfides such as barium sulfate; carbon black (C. I. Pigment Black 7) such as furnace carbon black, lamp black, acetylene black, and channel black; and yellow ocher, ultramarine, and Prussian blue.

Examples of the organic pigments include azo pigments such as insoluble azo pigments, condensed azo pigments, azo lakes, and chelate azo pigments; polycyclic pigments such as phthalocyanine pigments, perylene and perinone pigments, anthraquinone pigments, quinacridone pigments, dioxane pigments, thioindigo pigments, isoindolinone pigments, and quinophthalone pigments; and nitro pigments, nitroso pigments, aniline black, and daylight fluorescent pigments.

In the case where the first ink according to the present embodiment is a white ink, examples of the first colorant to be used include barium sulfate and titanium oxide. The first ink used as a white ink can hide the color of a recording medium, which leads to excellent color development of images recorded with the second ink.

In the case where the first ink according to the present embodiment is a glitter ink, examples of the first colorant to be used include aluminum and silver. The first ink is used as a glitter ink in combination with the second ink for recording, which enables formation of images having glitter.

A pigment to be contained in the second ink according to the present embodiment may be appropriately selected on the basis of the type of the ink to be used.

In the case where the second ink according to the present embodiment is a black ink, for example, carbon black can be used as the pigment.

In the case where the second ink according to the present embodiment is a magenta or red ink, examples of a pigment to be used include C. I. Pigment Red 2, 3, 5, 6, 7, 15, 16, 48:1, 53:1, 57:1, 122, 123, 139, 144, 149, 166, 170, 177, 178, 194, 202, 209, 222, and 224; and C. I. Pigment Violet 19.

In the case where the second ink according to the present embodiment is an yellow or orange ink, examples of a pigment to be used include C. I. Pigment Orange 31, 43, and 64; and C. I. Pigment Yellow 12, 13, 14, 15, 17, 74, 93, 94, 128, 138, 150, 155, 180, and 185.

In the case where the second ink according to the present embodiment is a cyan, blue, or green ink, examples of a pigment to be used include C. I. Pigment Blue 15, 15:2, 15:3, 15:4, and 16; C. I. Vat Blue 60; C. I. Pigment Violet 19, 23, 32, 36, and 38; and C. I. Pigment Greens 7 and 36.

The pigment content in the ink according to the present embodiment can be appropriately selected in view of intended uses and printing properties and is preferably 0.5 to 25 mass %, more preferably 0.5 to 15 mass %, and especially preferably 1 to 10 mass %.

1. 2. Polyester-Modified Polydialkylsiloxane

The ink of the present embodiment contains polyester-modified polydialkylsiloxane. The slip properties (slippage) of a coating film (formed with ink) can be therefore enhanced, which can reduce damage to the coating film caused by the film being rubbed.

The polyester-modified polydialkylsiloxane contained in the ink of the present embodiment contains a repeating unit represented by the following general formula (6) and at least one of a repeating unit represented by the following general formula (7) and a polymer terminal represented by the following general formula (8), and these repeating units and polymer terminal may be used alone or in combination of two or more,

wherein $R^{41}$ represents a linear or branched alkyl group having 1 to 3 carbon atoms, and $R^{42}$ represents a linear or branched alkyl group having 1 to 15 carbon atoms,

wherein $R^{43}$ represents a linear or branched alkyl group having 1 to 3 carbon atoms, and $X^{41}$ represents a polyester-modified group,

wherein $R^{44}$ represents a linear or branched alkyl group having 1 to 3 carbon atoms, and $X^{42}$ represents a polyester-modified group.

The number of siloxane units constituting the main chain of polyester-modified polydialkylsiloxane is not specifically limited but can be, for example, in the range of 30 to 350, and preferably 40 to 250. Within such a range, images having excellent abrasion resistance can be recorded. Polyester-modified polydialkylsiloxane serves as a good surfactant in the case where the number of siloxane units is from 1 to 30 and serves as a good defoaming agent in the case where the number of siloxane units is from 350 to 2000.

The weight-average molecular weight of polyester-modified polydialkylsiloxane is not specifically limited but can be from 4000 to 30000.

Polyester-modified polydimethylsiloxane or polyester-modified polymethylalkylsiloxane enables the viscosity of the ink to be readily adjusted to a range suitable for an ink jet ink (e.g., 1 to 10 mPa·s) and is therefore preferably used as the above-mentioned polyester-modified polydialkylsiloxane. Furthermore, a co-modified silicone compound containing an organic group other than a polyester-modified group, such as an epoxy group or an amino group, may be employed. Moreover, a compound containing one or more (meth)acryloyl groups in its molecule may be employed, and such a compound can exhibit sufficient crosslink density after being cured by irradiation with active energy rays.

At least one of polyester-modified polydialkylsiloxane contained in the first ink and polyester-modified polydialkylsiloxane contained in the second ink preferably has a hydroxyl group, and such polyester-modified polydialkylsiloxane having a hydroxyl group is more preferably contained at least in the first ink.

Use of polyester-modified polydialkylsiloxane having a hydroxyl group imparts excellent abrasion resistance to images recorded with the first and second inks and reduces agglomeration unevenness.

The term "agglomeration unevenness" refers to the following phenomenon: in the case where ink droplets applied onto a recording medium are not sufficiently absorbed into the recording medium or are not dried before the subsequent application of droplets of another ink onto the recording medium during ink jet recording, such ink droplets remain on a surface of the recording medium in a liquid state and are mixed with subsequently applied ink droplets with the result that a colorant contained in the ink partially agglomerates and cause uneven concentration. Such a phenomenon may be readily caused in printing on a recording medium having low absorbability, such as a vinyl chloride sheet.

The polyester-modified polydialkylsiloxane having a hydroxyl group may have any structure; for example, a unit represented by the following general formula (9) may be contained, or the polyester-modified group in the general formula (7) or (8) may be a polyester-modified group having a hydroxyl group. As the polyester-modified group having a hydroxyl group, the polyester-modified group itself may contain a hydroxyl group, or a polyoxyalkylene glycol chain may be added to the polyester-modified group to form a polyether-ester-modified group. The polyoxyalkylene glycol chain preferably contains at least one of a polyoxyethylene glycol chain and a polyoxypropylene glycol chain and can be in the form of a random copolymer or a block copolymer when the both chains are contained,

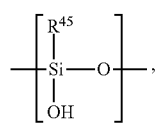

(9)

wherein $R^{45}$ represents a linear or branched alkyl group having 1 to 3 carbon atoms.

The polyester-modified polydialkylsiloxane content is preferably 0.01 to 3 mass %, and more preferably 0.5 to 2 mass % relative to the total amount (100 mass %) of the ink composition, which can give an advantageous effect in which the slip properties (slippage) of a coating film (formed with the ink) can be enhanced with the result that damage to the coating film caused by the film being rubbed can be reduced.

The polyester-modified polydialkylsiloxane can be produced by a known method. In polydialkylsiloxane having a hydroxyl group or alkoxy group at the terminal of the main chain thereof, for instance, the hydroxyl group or alkoxy group may be substituted with a polyester-modified group to produce polyester-modified polydialkylsiloxane. In order to produce the polyester-modified polydialkylsiloxane having a hydroxyl group, for example, the above-mentioned hydroxyl group or alkoxy group may be substituted with a polyester-modified group having a hydroxyl group.

Commercially available products may be used as polyester-modified polydialkylsiloxane, and examples of such commercially available products include the BYK series manufactured by BYK Japan KK, such as BYK-310 (polyester-modified polydimethylsiloxane), 313 (polyester-modified polydimethylsiloxane), 315 (polyester-modified polymethylalkylsiloxane), 370 (polyester modified hydroxy functional polydimethylsiloxane), 371 (acrylfunctional polyester modified polydimethylsiloxane), and 375 (polyether-polyester modified hydroxy functional polydimethylsiloxane).

In the invention, the term "ink" refers to an ink composition to which water has not been intentionally added during production thereof; thus, a slight amount of water unavoidably mixed during production or storage of the ink composition may be contained in the ink composition.

Components contained in the ink according to the present embodiment will now be described in detail.

1. 3. Organic Solvent

The ink according to the present embodiment can contain an organic solvent. The ink of the present embodiment can be used as an aqueous ink or a non-aqueous ink and is preferably a non-aqueous ink in the case where the ink is used for printing on a recording medium having low absorbability, such as a vinyl chloride resin. The term "non-aqueous ink" herein refers to an ink which does not substantially contain water and also refers to an ink composition to which water has not been intentionally added during production thereof; thus, a slight amount of water unavoidably mixed during production or storage of the ink composition may be contained in the ink composition. An organic solvent preferably used in the ink that is a non-aqueous ink will be hereinafter described in detail.

1. 3. 1. Heterocyclic Compound

The ink of the present embodiment can contain a heterocyclic compound. Heterocyclic compounds serve to enhance the fixing property of ink applied onto a recording medium having low absorbability, and lactams and lactones are preferably employed. Heterocyclic compounds have the good action of dissolving vinyl chloride resins and can therefore enhance the fixing property of the ink to vinyl chloride resin-containing recording media having low absorbability.

Preferred lactams to be employed are pyrrolidone derivatives which have the better action of dissolving vinyl chloride resins. Examples of the pyrrolidone derivatives include N-methyl-2-pyrrolidone, N-ethyl-2-pyrrolidone, N-vinyl-2-pyrrolidone, 2-pyrrolidone, and 5-methyl-2-pyrrolidone. Lactams may be used alone or in combination of two or more.

Preferred lactones are lactones having not more than 6 carbon atoms, and more preferred lactones are β-propiolactone, β-butyrolactone, γ-butyrolactone, γ-valerolactone, γ-caprolactone, δ-valerolactone, and ε-caprolactone. Lactones may be used alone or in combination of two or more.

The heterocyclic compound content is preferably 1 to 30 mass %, more preferably 3 to 20 mass %, and especially preferably 10 to 20 mass % relative to the total mass of the non-aqueous ink composition. The heterocyclic compound content within such a range can enhance the abrasion resistance of images in some cases.

1. 3. 2. Amide Compound Represented by General Formula (1)

The ink according to the present embodiment can contain an amide compound represented by the following general formula (1). Such an amide compound serves to enhance the fixing property of the ink applied onto recording media having low absorbability. The amide compound has the good action of dissolving vinyl chloride resins and can therefore enhance the fixing property of the ink to vinyl chloride resin-containing recording media having low absorbability,

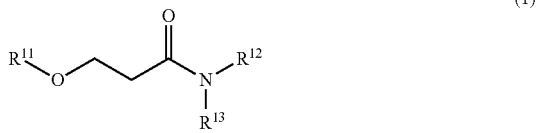

(1)

In the general formula (1), $R^{11}$ represents an alkyl group having 1 to 4 carbon atoms, and $R^{12}$ and $R^{13}$ each independently represent a methyl group or an ethyl group. The alkyl group having 1 to 4 carbon atoms can be a linear or branched alkyl group, and examples of such an alkyl group include a methyl group, an ethyl group, an n-propyl group, an iso-propyl group, an n-butyl group, a sec-butyl group, an iso-butyl group, and a tert-butyl group. The compounds represented by the general formula (1) may be used alone or in combination of two or more.

The amide compound represented by the general formula (1), for example, serves to enhance the surface dryness and fixing property of the ink applied onto recording media having low absorbability and, in particular, is highly useful for moderately dissolving vinyl chloride resins. Hence, the compound represented by the general formula (1) dissolves a recording surface containing a vinyl chloride resin, so that the ink can penetrate into recording media having low absorbability. Such penetration of the ink into recording media having low absorbability enables the ink to be tightly fixed and enables the surface of the ink to be readily dried. Images to be formed thus exhibit excellent surface dryness and fixing property.

$R^{11}$ in the general formula (1) is preferably a methyl group having one carbon atom. An amide compound in which $R^{11}$ in the general formula (1) is a methyl group has a normal boiling point lower than that of an amide compound in which $R^{11}$ in the general formula (1) is an alkyl group having 2 to 4 carbon atoms. Use of such an amide compound in which $R^{11}$ in the general formula (1) is a methyl group can therefore further enhance the surface dryness of images in some cases (in particular, the surface dryness of images recorded under high-temperature and humidity environments).

The term "high-temperature and humidity environments" herein refers to environments at a temperature of not less than 30° C. and a humidity of not less than 70% (in particular, approximately 30 to 45° C. and 70 to 100% relative humidity (RH)). Surfaces of images to be recorded on recording media are less likely to be dried in printing under high-temperature and humidity environments than in printing under normal environments (e.g., approximately 20 to 25° C. and 40 to 60% RH).

The content of the amide compound represented by the general formula (1) can be, but is not limited to, 5 to 50 mass %, and preferably 8 to 48 mass % relative to the total mass of the ink. The content of the amide compound represented by the general formula (1) within such a range can further enhance the fixing property and surface dryness of images in some cases (in particular, the surface dryness of images recorded under high-temperature and humidity environments).

1. 3. 3. Compound Represented by General Formula (2)

The ink according to the present embodiment can contain a compound represented by the following general formula (2).

A dicarboxylic acid dialkyl ester represented by the general formula (2) is a kind of dialkyl esters of saturated aliphatic dicarboxylic acids,

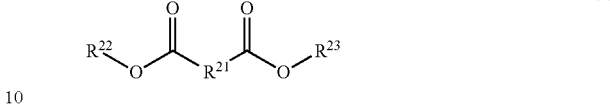

(2)

In the general formula (2), $R^{21}$ represents an alkylene group having 2 to 5 carbon atoms, and $R^{22}$ and $R^{23}$ each independently represent an alkyl group having 1 to 4 carbon atoms. The alkylene group having 2 to 5 carbon atoms can be a linear or branched alkylene group, and examples of such an alkylene group include an ethylene group and a linear or branched alkylene group having 3 to 5 carbon atoms. The alkyl group having 1 to 4 carbon atoms can be a linear or branched alkyl group, and examples of such an alkyl group include a methyl group, an ethyl group, an n-propyl group, an iso-propyl group, an n-butyl group, a sec-butyl group, an iso-butyl group, and a tert-butyl group. The compounds represented by the general formula (2) may be used alone or in combination of two or more.

The dicarboxylic acid dialkyl ester represented by the general formula (2) serves to enhance the surface dryness of the ink applied onto recording media having low absorbability. Hence, although not as much as the amide compound represented by the general formula (1), the dicarboxylic acid dialkyl ester represented by the general formula (2) dissolves a recording surface containing a vinyl chloride resin, so that the ink can penetrate into recording media having low absorbability. Such penetration of the ink into recording media having low absorbability enables the surface of the ink to be dried within a short period. Images to be formed thus exhibit good surface dryness.

In the general formula (2), $R^{21}$ is preferably an alkylene group having 4 to 5 carbon atoms; thus, the surface dryness of ink applied under high-temperature and humidity environments can be further enhanced.

If $R^{21}$ in the general formula (2) is an alkylene group having not less than 6 carbon atoms, the normal boiling point of a solvent composed of such a compound tends to be excessively high. The surface dryness of the ink applied under high-temperature and humidity environments therefore tends to decrease. If $R^{21}$ in the general formula (2) is an alkylene group having not more than 3 carbon atoms, difficulty in handling is caused in some cases, due to control of environmental concentration, installation of local ventilation for, for instance, odors, or necessity for a regular health check.

Specific examples of dicarboxylic acid dialkyl ester represented by the general formula (2) include dimethyl succinate, diethyl succinate, diisobutyl succinate, dimethyl glutarate, diethyl glutarate, diisobutyl glutarate, dimethyl adipate, diethyl adipate, diisobutyl adipate, diisobutyl adipate, dimethyl pimelate, diethyl pimelate, diisobutyl pimelate, 2-ethylglutaric acid dimethyl ester, 2-ethylglutaric acid diethyl ester, and 2-ethylglutaric acid diisobutyl ester.

The content of the dicarboxylic acid dialkyl ester represented by the general formula (2) can be, but is not limited to, 5 to 50 mass %, and preferably 8 to 48 mass % relative to the total mass of the ink. The content of the dicarboxylic acid dialkyl ester represented by the general formula (2) within such a range can further enhance the surface dryness of images in some cases (in particular, the surface dryness of images recorded under high-temperature and humidity environments).

1.3.4. Polyoxyalkylene Glycol Compound Represented by General Formula (3)

The ink of the present embodiment can contain a polyoxyalkylene glycol compound represented by the following general formula (3), $$R^{32}-(OR^{31})_n-O-R^{33} \quad (3)$$

In the general formula (3), $R^{31}$ represents an alkylene group having 2 or 3 carbon atoms, $R^{32}$ and $R^{33}$ each independently represent a hydrogen atom or an alkyl group having 1 to 6 carbon atoms (preferably, alkyl group having 1 to 4 carbon atoms), and n is an integer from 2 to 6. Examples of the alkylene group having 2 or 3 carbon atoms include an ethylene group and a propylene group. The alkyl group having 1 to 6 carbon atoms can be a linear or branched alkyl group, and examples thereof include the above-mentioned alkyl group having 1 to 4 carbon atoms and linear or branched pentyl and hexyl groups.

The polyoxyalkylene glycol compound represented by the general formula (3) serves to fix the ink applied onto recording media having low absorbability. In particular, in the cases where a vinyl chloride resin is used as a recording medium having low absorbability and where the compound represented by the general formula (3) is a dialkyl ether, the ink applied onto the recording medium can be more tightly fixed.

Among the polyoxyalkylene glycol compounds represented by the general formula (3), a diethylene glycol compound represented by the following general formula (4) or a dipropylene glycol compound represented by the following general formula (5) is preferably employed, $$R^{34}-(OC_2H_4)_2-O-R^{35} \quad (4)$$

In the general formula (4), $R^{34}$ and $R^{35}$ are each independently a hydrogen atom, an alkyl group having 1 to 4 carbon atoms, or an $R^{36}CO$ group. $R^{36}$ is an alkyl group having 1 to 4 carbon atoms. The alkyl group having 1 to 4 carbon atoms can be a linear or branched alkyl group. Among the diethylene glycol compounds represented by the general formula (4), diethylene glycol dialkyl ethers can more tightly fix the ink applied onto recording media having low absorbability and are therefore preferably employed.

$$R^{37}-(OC_3H_6)_2-O-R^{38} \quad (5)$$

In the general formula (5), $R^{37}$ and $R^{38}$ each independently represent a hydrogen atom, an alkyl group having 1 to 4 carbon atoms, or an $R^{39}CO$ group. $R^{39}$ is an alkyl group having 1 to 4 carbon atoms. The alkyl group having 1 to 4 carbon atoms can be a linear or branched alkyl group. Among the dipropylene glycol compounds represented by the general formula (5), dipropylene glycol dialkyl ethers can more tightly fix the ink applied onto recording media having low absorbability and are therefore preferably employed.

Specific examples of the diethylene glycol compounds represented by the general formula (4) include diethylene glycol, diethylene glycol monomethyl ether, diethylene glycol monoethyl ether, diethylene glycol dimethyl ether, diethylene glycol ethyl methyl ether, diethylene glycol diethyl ether, diethylene glycol mono-n-butyl ether, diethylene glycol di-n-butyl ether, diethylene glycol butyl methyl ether, diethylene glycol monoethyl ether acetate, and diethylene glycol mono-n-butyl ether acetate. Among these, dialkyl ethers are preferably employed.

Examples of the dipropylene glycol compounds represented by the general formula (5) include dipropylene glycol, dipropylene glycol monomethyl ether, dipropylene glycol monoethyl ether, and dipropylene glycol dimethyl ether.

Examples of polyalkylene glycol monoalkyl ethers include triethylene glycol monomethyl ether, triethylene glycol monobutyl ether, tripropylene glycol monobutyl ether, polyethylene glycol monobutyl ether represented by the general formula (3) in which n is from 4 to 6, tetraethylene glycol monomethyl ether, pentaethylene glycol monomethyl ether, and hexaethylene glycol monomethyl ether.

An example of polyalkylene glycol dialkyl ethers is tetraethylene glycol dimethyl ether.

In the case where the ink according to the present embodiment contains a polyoxyalkylene glycol compound represented by any of the general formulae (3) to (5), the content thereof can be appropriately selected on the basis of printing properties and is preferably 20 to 80 mass %, and more preferably 30 to 75 mass % relative to the total mass of the ink.

1.4. Other Components

The ink according to the present embodiment may optionally contain an organic solvent other than the above-mentioned organic solvents, a surfactant, a dispersant, a binder resin, and other materials.

1.4.1. Other Organic Solvents

Other organic solvents which may be contained in the ink of the present embodiment are preferably polar organic solvents, and examples thereof include alcohols (e.g., ethyl alcohol, 1-propanol, and fluorinated alcohol) and ethers (e.g., diethyl ether and dipropyl ether).

In view of easy handling and a reduction in an environmental load, the ink according to the present embodiment is preferably free from second-class organic solvents (see attached list 6.2 of Japanese Industrial Safety and Health Law Enforcement Ordinance).

1.4.2. Surfactant

In addition to the above-mentioned organic solvents, the ink of the present embodiment may contain a silicone-based surfactant, a fluorine-based surfactant, or a polyoxyethylene derivative being a nonionic surfactant, which can reduce surface tension and enhance the wettability of the ink to recording media.

Preferred silicone-based surfactants to be used are polyester-modified silicone and polyether-modified silicone. Specific examples of such silicone surfactants include BYK-347 and 348; and BYK-UV3500, UV3510, UV3530, and UV3570 (commercially available from BYK Japan KK).

Preferred fluorine-based surfactants to be used are fluorine-modified polymers, and a specific example thereof is BYK-340 (commercially available from BYK Japan KK).

Preferred polyoxyethylene derivatives to be used are acetylene glycol surfactants. Specific examples of the acetylene glycol surfactants include Surfynol (registered trademark) 82, 104, 465, 485, and TG (commercially available from Air Products Japan, Inc.); Olfine (registered trademark) STG and E1010 (commercially available from Nissin Chemical Industry Co., Ltd.); NONION A-10R and A-13R (commercially available from NOF CORPORATION); FLOWLEN TG-740W and D-90 (commercially available from kyoeisha Chemical Co., Ltd.); and NOIGEN CX-100 (commercially available from Dai-ichi Kogyo Seiyaku Co., Ltd.).

The surfactant content in the ink according to the present embodiment is preferably in the range of 0.05 to 3 mass %, and more preferably 0.5 to 2 mass %.

1.4.3. Dispersant

In order to enhance the dispersion stability of the pigments, the ink according to the present embodiment can contain any dispersant which can be used in general inks. Surfactants which effectively work in the case where the solubility parameter of an organic solvent is from 8 to 11 are preferably used. Specific examples of such dispersants include polyester compounds such as Hinoact KF1-M, T-6000, T-7000, T-8000, T-8350P, and T-8000E (commercially available from Takefu Fine Chemical Company); Solsperse 20000, 24000, 32000, 32500, 33500, 34000, 35200, and 37500 (commercially available from Lubrizol Corporation); DISPERBYK-161, 162, 163, 164, 166, 180, 190, 191, and 192 (commercially available from BYK Japan KK); FLOWLEN DOPA-17, 22, 33, and G-700 (commercially available from KYOEISHA CHEMICAL Co., LTD); AJISPER PB821 and PB711 (commercially available from Ajinomoto Fine-Techno Co., Inc.); and LP4010, LP4050, LP4055, and POLYMER 400, 401, 402, 403, 450, 451, and 453 (commercially available from EFKA chemicals Company).

The dispersant content in the ink according to the present embodiment can be appropriately adjusted on the basis of the pigment to be dispersed and is preferably in the range of 5 to 200 parts by mass, and more preferably 30 to 120 parts by mass relative to 100 parts by mass of the pigment content in the ink.

1. 4. 4. Binder Resin

The ink according to the present embodiment can contain a binder resin to further enhance the fixing property of the ink to recording media having low absorbability.

Examples of the binder resin include fibrous resins such as acrylic resins, styrene acrylic resins, rosin-modified resins, phenolic resins, terpene resins, polyester resins, polyamide resins, epoxy resins, vinyl chloride-vinyl acetate copolymer resins, and cellulose acetate butyrate; and vinyltoluene-α-methylstyrene copolymer resins. Among these, vinyl chloride resins or vinyl chloride-vinyl acetate copolymer resins are preferably used.

The resin content in the ink according to the present embodiment is preferably 0.05 to 15 mass %, and more preferably 0.1 to 10 mass %.

1. 4. 5. Other Materials

The ink according to the present embodiment may further contain other additives which are contained in general inks. Examples of such other additives include stabilizers such as an antioxidant and an ultraviolet absorber.

Examples of the antioxidant include 2,3-butyl-4-oxyanisole (BHA) and 2,6-di-t-butyl-p-cresol (BHT).

Examples of the ultraviolet absorber include benzophenone compounds and benzotriazole compounds.

1. 5. Method for Producing Ink

The ink according to the present embodiment can be produced by a known technique. In the case where a pigment is used as a colorant, the pigment, a dispersant, and part of an organic solvent are first mixed, and then a pigment dispersion is prepared with a ball mill, a bead mill, an ultrasonic technique, or a jet mill so as to exhibit desired ink properties. Then, the rest of the organic solvent and other additives (e.g., surfactant and binder resin) are added to the pigment dispersion while being stirred, thereby producing the ink.

1. 6. Physical Properties

In view of the balance between recording quality and the reliability as an ink jet ink composition, the surface tension of the ink of the present embodiment at 20° C. is in the range of 20 to 50 mN/m, and more preferably 25 to 40 mN/m. Surface tension can be measured as follows: ink is applied onto a platinum plate at 20° C., and then an Automatic Surface Tensiometer CBVP-Z (commercially available from Kyowa Interface Science Co., Ltd) is used to measure surface tension on the platinum plate.

Furthermore, from the same viewpoint, the viscosity according to the ink of the present embodiment at 20° C. is preferably in the range of 2 to 15 mPa·s, and more preferably 2 to 10 mPa·s. Viscosity can be measured as follows: a shear rate is increased from 10 to 1000 at 20° C. and then a viscoelastic analyzer MCR-300 (commercially available from Physica Messtechnik GmbH) is used to read the viscosity at a shear rate of 200.

2. Ink Jet Recording Method

In an ink jet recording method according to the present embodiment, droplets of the above-mentioned ink are ejected and then applied to a recording medium having low absorbability to record an image.

The term "recording medium having low absorbability" herein refers to a recording medium that absorbs not more than 10 mL/m$^2$ of water for a contact time of 30 msec$^{1/2}$ in accordance with the Bristow's Method. At least a recording surface may exhibit such a characteristic. On the basis of such a definition, the term "recording medium having low absorbability" herein includes recording media having no absorbability, such recording media not absorbing water at all. The Bristow's Method has been most widely used as one of quick measurement methods for determining liquid absorption and is also endorsed by Japan Technical Association of the Pulp and Paper Industry (JAPAN TAPPI). The details of this method are specified in Standard No. 51 [Paper and Paperboard-Liquid Absorption Test Method-Bristow's Method (in Japanese)] of *JAPAN TAPPI Test Methods edited in* 2000 (in Japanese).

Specific examples of recording media having low absorbability include sheets, films, and textile products each containing a material having low absorbability. In recording media having low absorbability, a layer containing a material having low absorbability (hereinafter referred to as "layer having low absorbability") may be formed on a surface of a substrate (e.g., paper, a fibrous material, leather, a plastic material, glass, ceramic, and metal). Examples of the material having low absorbability include, but are not limited to, olefin resins, ester resins, urethane resins, acrylic resins, and vinyl chloride resins.

Among such recording media having low absorbability, a recording medium having a recording surface which contains a vinyl chloride resin can be preferably used. Specific examples of vinyl chloride resins include polyvinyl chloride, vinyl chloride-ethylene copolymers, vinyl chloride-vinyl acetate copolymers, vinyl chloride-vinyl ether copolymers, vinyl chloride-vinylidene chloride copolymers, vinyl chloride-maleate copolymers, vinyl chloride-(meth)acrylate copolymers, vinyl chloride-(meth)acrylate copolymers, and vinyl chloride-urethane copolymers. The characteristics of the recording medium having low absorbability, such as thickness, shape, color, softening temperature, and hardness, may not be specifically limited.

In the case where the ink according to the present embodiment contains a heterocyclic compound or the amide compound represented by the general formula (1) and the compound represented by the general formula (2), such compounds serve to dissolve vinyl chloride resins as described above. Hence, droplets of such an ink are applied onto a recording medium containing a vinyl chloride resin, so that images exhibiting more excellent fixing property and surface dryness (in particular, the surface dryness of images recorded under high-temperature and humidity environments) can be recorded.

Although any ink jet recording apparatus can be used in the ink jet recording method according to the present embodiment, drop-on-demand-type ink jet recording apparatuses are preferably used. The drop-on-demand-type ink jet recording apparatuses are classified into the following types: an apparatus in which a piezoelectric technique is employed to perform recording with a piezoelectric device provided to a recording head; and an apparatus in which a thermal ink jet technique is employed to perform recording with the thermal energy released from, for example, a heater of a resistive heating device provided to a recording head. Any type of the above apparatuses may be used in the recording method. The ink of the present embodiment has an advantage in which the ink is inert to an ink-repellent surface of an ejection nozzle. The ink can be therefore advantageously used in an ink jet recording method, for instance, in which droplets of the ink are ejected from an ink jet recording head having an ejection nozzle with an ink-repellent surface.

3. Examples

Although embodiments of the invention will now be more specifically described with reference to Examples and Comparative Examples, embodiments are not limited to Examples.

3. 1. Preparation of Ink

Organic solvents were put into containers for individual inks in amounts equivalent to the concentrations shown in Tables 1 to 3 and then mixed and stirred with a magnetic stirrer for 30 minutes to produce mixed solvents.

Part of each of the mixed solvents was collected, a dispersant and a pigment were added to the collected part in predetermined amounts shown in Tables 1 to 3, and the mixture was ground with a homogenizer. Then, the mixture was dispersed with a bead mill filled with zirconia beads each having a diameter of 0.3 mm to produce a pigment dispersion. The volume-average particle diameter in the pigment dispersion was measured, and results of the measurement were as follows: a cyan pigment dispersion: 220 nm, a yellow pigment dispersion: 190 nm, and a white pigment dispersion: 200 nm.

The rest of the mixed solvent and a binder resin shown in Tables 1 to 3 were added to the pigment dispersion, and the mixture was further mixed and stirred for an hour and then filtered through a membrane filter formed from polytetrafluoroethylene (PTFE) and having a mesh of 5 μm thereby producing a cyan ink (second ink), an yellow ink (second ink), and a white ink (first ink) shown in Tables 1 to 3. Values in Tables are indicated by mass %.

The materials shown in Tables were as follows:
Cyan pigment (C. I. Pigment Blue 15:3 commercially available from Clariant)
Yellow pigment (C. I. Pigment Yellow 180 commercially available from Clariant)
White pigment (titanium oxide commercially available from TAYCA CORPORATION)
Solsperse 37500 (dispersant commercially available from Lubrizol Corporation)
Solsperse 5000 (dispersant commercially available from Lubrizol Corporation)
Solsperse 34000 (dispersant commercially available from Lubrizol Corporation)
γ-BL (γ-butyrolactone, organic solvent commercially available from Mitsubishi Chemical Corporation)
3M-DMPA (3-methoxy-N,N-dimethylpropionamide, organic solvent)
Diisobutyl succinate (organic solvent commercially available from Rhodia)
2-ethylglutaric acid dimethyl ester (organic solvent commercially available from Rhodia)
DEGEME (diethylene glycol ethyl methyl ether, organic solvent commercially available from NIPPON NYUKAZAI CO., LTD.)
DEGdEE (diethylene glycol diethyl ether, organic solvent commercially available from NIPPON NYUKAZAI CO., LTD.)
Paraloid B-60 (acrylic resin commercially available from The Dow Chemical Company)
Paraloid B-66 (acrylic resin commercially available from The Dow Chemical Company)
BYK-300 (polyether-modified polydimethylsiloxane commercially available from BYK Japan KK)
BYK-306 (polyether-modified polydimethylsiloxane commercially available from BYK Japan KK)
BYK-330 (polyether-modified polydimethylsiloxane commercially available from BYK Japan KK)
BYK-331 (polyether-modified polydimethylsiloxane commercially available from BYK Japan KK)
BYK-337 (polyether-modified polydimethylsiloxane commercially available from BYK Japan KK)
BYK-323 (aralkyl-modified polymethylalkylsiloxane commercially available from BYK Japan KK)
BYK-313 (polyester-modified polydimethylsiloxane commercially available from BYK Japan KK)
BYK-315 (polyester-modified polymethylalkylsiloxane commercially available from BYK Japan KK)
BYK-370 (polyester modified hydroxy functional polydimethylsiloxane commercially available from BYK Japan KK)
BYK-375 (solution of a polyether-polyester-modified, hydroxy-functional polydimethylsiloxane commercially available from BYK Japan KK)

TABLE 1

| Items | Materials | c1 | c2 | c3 | c4 | c5 | c6 | c7 | C1 | C2 | C3 | C4 | C5 | C6 | C7 | C8 |
|---|---|---|---|---|---|---|---|---|---|---|---|---|---|---|---|---|
| Pigment | Cyan pigment | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Dispersant | Solsperse 37500 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Organic solvents | γ-BL | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
|  | DEGdEE | 68.0 | 67.8 | 67.8 | 67.8 | 67.8 | 67.8 | 67.8 | 67.8 | 67.8 | 67.8 | 67.8 | 68.0 | 68.0 | 67.0 | 67.0 |
| Binder resin | Paraloid B60 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Polyether-modified polydialkylsiloxane | BYK-300 |  | 0.2 |  |  |  |  |  |  |  |  |  |  |  |  |  |
|  | BYK-306 |  |  | 0.2 |  |  |  |  |  |  |  |  |  |  |  |  |
|  | BYK-330 |  |  |  | 0.2 |  |  |  |  |  |  |  |  |  |  |  |
|  | BYK-331 |  |  |  |  | 0.2 |  |  |  |  |  |  |  |  |  |  |
|  | BYK-337 |  |  |  |  |  | 0.2 |  |  |  |  |  |  |  |  |  |
| Aralkyl-modified polydialkylsiloxane | BYK-323 |  |  |  |  |  |  | 0.2 |  |  |  |  |  |  |  |  |

TABLE 1-continued

| Items | Materials | c1 | c2 | c3 | c4 | c5 | c6 | c7 | C1 | C2 | C3 | C4 | C5 | C6 | C7 | C8 |
|---|---|---|---|---|---|---|---|---|---|---|---|---|---|---|---|---|
| Polyester-modified polydialkylsiloxane | BYK-313 | | | | | | | | 0.1 | | 0.2 | | 0.02 | | 1.00 | |
| | BYK-315 | | | | | | | | | 0.1 | | 0.2 | | 0.02 | | 1.00 |
| | BYK-370 | | | | | | | | | | 0.1 | | | | | |
| | BYK-375 | | | | | | | | | | | 0.1 | | | | |
| Total | | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Abrasion resistance | | 1 | 3 | 3 | 3 | 3 | 3 | 3 | 3 | 3 | 3 | 3 | 3 | 3 | 3 | 3 |

TABLE 2

| Items | Materials | w1 | w2 | w3 | w4 | w5 | w6 | w7 | W1 | W2 | W3 | W4 | W5 | W6 | W7 | W8 |
|---|---|---|---|---|---|---|---|---|---|---|---|---|---|---|---|---|
| Pigment | White pigment | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Dispersants | Solsperse 5000 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| | Solsperse 34000 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Organic solvents | γ-BL | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| | DEGdEE | 53.0 | 52.6 | 52.6 | 52.6 | 52.6 | 52.6 | 52.6 | 52.6 | 52.6 | 52.6 | 52.6 | 52.9 | 52.9 | 52.0 | 52.0 |
| Binder resin | Paraloid B66 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| Polyether-modified polydialkylsiloxane | BYK-300 | | 0.4 | | | | | | | | | | | | | |
| | BYK-306 | | | 0.4 | | | | | | | | | | | | |
| | BYK-330 | | | | 0.4 | | | | | | | | | | | |
| | BYK-331 | | | | | 0.4 | | | | | | | | | | |
| | BYK-337 | | | | | | 0.4 | | | | | | | | | |
| Aralkyl-modified polydialkylsiloxane | BYK-323 | | | | | | | 0.4 | | | | | | | | |
| Polyester-modified polydialkylsiloxane | BYK-313 | | | | | | | | 0.4 | | | | | | | |
| | BYK-315 | | | | | | | | | 0.4 | | | | | | |
| | BYK-370 | | | | | | | | | | 0.4 | | 0.10 | | 1.00 | |
| | BYK-375 | | | | | | | | | | | 0.4 | | 0.10 | | 1.00 |
| Total | | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Abrasion resistance | | 1 | 3 | 4 | 4 | 3 | 4 | 3 | 3 | 3 | 4 | 4 | 4 | 4 | 4 | 4 |

TABLE 3

| Items | Materials | C9 | C10 | C11 | Y1 | Y2 | Y3 | Y4 | Y5 | Y6 | W9 | W10 | W11 |
|---|---|---|---|---|---|---|---|---|---|---|---|---|---|
| Pigments | Cyan pigment | 4.0 | 4.0 | 4.0 | | | | | | | | | |
| | Yellow pigment | | | | 4.0 | 4.0 | 4.0 | 4.0 | 4.0 | 4.0 | | | |
| | White pigment | | | | | | | | | | 10.0 | 10.0 | 10.0 |
| Dispersants | Solsperse 37500 | 4.0 | 4.0 | 4.0 | 4.0 | 4.0 | 4.0 | 4.0 | 4.0 | 4.0 | | | |
| | Solsperse 5000 | | | | | | | | | | 5.0 | 5.0 | 5.0 |
| | Solsperse 34000 | | | | | | | | | | 5.0 | 5.0 | 5.0 |
| Organic solvents | γ-BL | | 20.0 | 20.0 | 20.0 | 20.0 | 20.0 | 20.0 | 20.0 | 20.0 | | 20.0 | 20.0 |
| | 3M-DMPA | 10.0 | | | | | | | | | 10.0 | | |
| | Diisobutyl succinate | | 10.0 | | | | | | | | | 10.0 | |
| | 2-ethyl-glutaric acid dimethyl ester | | | 10.0 | | | | | | | | | 10.0 |
| | DEGEME | 30.0 | 30.0 | 30.0 | | | | | | | 20.0 | 20.0 | 20.0 |
| | DEGdEE | 47.0 | 27.0 | 27.0 | 67.8 | 67.8 | 68.0 | 68.0 | 67.0 | 67.0 | 42.0 | 22.0 | 22.0 |
| Binder resin | Paraloid B60 | 4.0 | 4.0 | 4.0 | 4.0 | 4.0 | 4.0 | 4.0 | 4.0 | 4.0 | | | |
| | Paraloid B66 | | | | | | | | | | 7.0 | 7.0 | 7.0 |
| Polyester-modified polydialkylsiloxane | BYK-313 | | | | 0.2 | | 0.02 | | 1.00 | | | | |
| | BYK-315 | 1.00 | 1.00 | 1.00 | | 0.2 | | 0.02 | | 1.00 | | | |
| | BYK-370 | | | | | | | | | | | | |
| | BYK-375 | | | | | | | | | | 1.00 | 1.00 | 1.00 |
| Total | | 100.0 | 100.0 | 100.0 | 100.0 | 100.0 | 100.0 | 100.0 | 100.0 | 100.0 | 100.0 | 100.0 | 100.0 |
| Abrasion resistance | | 3 | 3 | 3 | 3 | 3 | 3 | 3 | 3 | 3 | 4 | 4 | 4 |

3. 3. Evaluation Test
3. 3. 1. Evaluation of Abrasion Resistance
3. 3. 1. 1. Production of Evaluation Sample Each white ink prepared in "3. 1. Preparation of Ink" was applied onto a glossy sheet of polyvinyl chloride ("SV-G-1270G" commercially available from Roland DG Corporation) with a printer "SP-300V" commercially available from Roland DG Corporation at a predetermined heater temperature of 50° C. during printing and at 200% Duty to print a first pattern, and the first pattern was dried for 10 minutes.

Then, each cyan or yellow ink prepared in "3. 1. Preparation of Ink" was applied onto the first pattern with a printer "SP-300V" commercially available from Roland DG Corporation at a predetermined heater temperature of 50° C. during printing and at 100% Duty to print a second pattern, and the second pattern was subsequently left to stand for 24 hours to produce an evaluation sample of abrasion resistance.

The first ink and the second ink were used in combination as shown in Tables 4 and 5.

3. 3. 1. 2. Production of Reference Sample

Inks (cyan, yellow, and white inks) prepared in "3. 1. Preparation of Ink" were each applied onto a glossy sheet of polyvinyl chloride ("SV-G-1270G" commercially available from Roland DG Corporation) with a printer "SP-300V" commercially available from Roland DG Corporation at a predetermined heater temperature of 50° C. during printing and at 200% Duty to print a first pattern, and then the first pattern was left to stand for 24 hours to produce a reference sample. In other words, the reference sample was not an evaluation sample for the ink set according to the above embodiment but a sample produced with the first or second ink alone.

The term "Duty" herein used is a value determined from the following formula.

Duty (%)=number of actually printed dots/(vertical resolution×horizontal resolution)×100

In the formula, the term "number of actually printed dots" indicates the number of actually printed dots per unit area, and the terms "vertical resolution" and "horizontal resolution" each indicate resolution per a unit length.

3. 3. 1. 3. Evaluation Test of Abrasion Resistance

Each of the above evaluation samples and reference samples was subjected to a rubbing test in accordance with JIS L 0849 using a type-I tester for evaluation of abrasion resistance. Then, the optical density (OD, dirtiness) of a cotton fabric used for the rubbing test was measured with a Spectrolino (manufactured by GRETAG MACBETH AG). Abrasion resistance was evaluated on the basis of the following criteria. Tables 1 to 3 show results of the evaluation of each reference sample, and Tables 4 and 5 show results of the evaluation of each evaluation sample.

3: less than 0.3
2: not less than 0.3 and less than 0.4
1: not less than 0.4

3. 3. 2. Evaluation of Agglomeration Unevenness (Image Quality)
3. 3. 2. 1. Production of Evaluation Sample White inks prepared in "3. 1. Preparation of Ink" were applied onto glossy sheets of polyvinyl chloride ("SV-G-1270G" commercially available from Roland DG Corporation) at a predetermined heater temperature of 50° C. during printing and at 200% Duty to print first patterns, and then the first patterns were dried for 10 minutes.

Then, cyan or yellow inks prepared in "3. 1. Preparation of Ink" were applied onto the first patterns with a printer "SP-300V" commercially available from Roland DG Corporation at a predetermined heater temperature of 50° C. during printing and at 100 to 300% Duty to print second patterns having different Duties, and the second patterns were subsequently left to stand for 24 hours to produce evaluation samples of agglomeration unevenness.

3. 3. 2. 2. Evaluation Test of Agglomeration Unevenness

The above-mentioned evaluation samples were visually observed to evaluate the presence or absence of agglomeration unevenness. The agglomeration unevenness was evaluated on the basis of the following criteria. Tables 4 and 5 show results of the evaluation of the evaluation samples.

3: No agglomeration unevenness even in a second pattern having 300% Duty
2: No agglomeration unevenness in a second pattern having not more than 200% Duty
1: No agglomeration unevenness in a second pattern having not more than 100% Duty

TABLE 4

|  | Comparative Examples |  |  |  |  |  |  |  |  |  |  |
|---|---|---|---|---|---|---|---|---|---|---|---|
|  | 1 | 2 | 3 | 4 | 5 | 6 | 7 | 8 | 9 | 10 | 11 |
| Second ink | c1 | c1 | c1 | c1 | c1 | c1 | c1 | c1 | c1 | c1 | c1 |
| First ink | w1 | w2 | w3 | w4 | w5 | w6 | W1 | W2 | W3 | W4 | W5 |
| Abrasion resistance | 2 | 2 | 1 | 1 | 2 | 1 | 2 | 1 | 2 | 2 | 2 |
| Agglomeration unevenness | 2 | 2 | 1 | 1 | 2 | 1 | 2 | 1 | 2 | 2 | 2 |

|  | Comparative Examples |  |  |  |  |  |  |  |  |  |  |
|---|---|---|---|---|---|---|---|---|---|---|---|
|  | 12 | 13 | 14 | 15 | 16 | 17 | 18 | 19 | 20 | 21 | 22 |
| Second ink | c2 | c2 | c2 | c2 | c2 | c2 | c2 | c2 | c2 | c2 | c2 |
| First ink | w1 | w2 | w3 | w4 | w5 | w6 | W1 | W2 | W3 | W4 | W5 |
| Abrasion resistance | 2 | 2 | 1 | 1 | 2 | 1 | 2 | 1 | 2 | 2 | 2 |
| Agglomeration unevenness | 2 | 2 | 1 | 1 | 2 | 1 | 2 | 1 | 2 | 2 | 2 |

|  | Comparative Examples |  |  |  |  |  |  |  |  |  |  |
|---|---|---|---|---|---|---|---|---|---|---|---|
|  | 23 | 24 | 25 | 26 | 27 | 28 | 29 | 30 | 31 | 32 | 33 |
| Second ink | c3 | c3 | c3 | c3 | c3 | c3 | c3 | c3 | c3 | c3 | c3 |
| First ink | w1 | w2 | w3 | w4 | w5 | w6 | W1 | W2 | W3 | W4 | W5 |
| Abrasion resistance | 2 | 2 | 2 | 1 | 2 | 1 | 2 | 1 | 2 | 2 | 2 |
| Agglomeration unevenness | 2 | 2 | 2 | 1 | 2 | 1 | 2 | 1 | 2 | 2 | 2 |

TABLE 4-continued

|  | Comparative Examples | | | | | | | | | | |
|---|---|---|---|---|---|---|---|---|---|---|---|
|  | 34 | 35 | 36 | 37 | 38 | 39 | 40 | 41 | 42 | 43 | 44 |
| Second ink | c4 | c4 | c4 | c4 | c4 | c4 | c4 | c4 | c4 | c4 | c4 |
| First ink | w1 | w2 | w3 | w4 | w5 | w6 | w7 | W1 | W2 | W3 | W4 |
| Abrasion resistance | 2 | 2 | 1 | 2 | 2 | 1 | 2 | 1 | 2 | 2 | 2 |
| Agglomeration unevenness | 2 | 2 | 1 | 2 | 2 | 1 | 2 | 1 | 2 | 2 | 2 |

|  | Comparative Examples | | | | | | | | | | |
|---|---|---|---|---|---|---|---|---|---|---|---|
|  | 45 | 46 | 47 | 48 | 49 | 50 | 51 | 52 | 53 | 54 | 55 |
| Second ink | c5 | c5 | c5 | c5 | c5 | c5 | c5 | c5 | c5 | c5 | c5 |
| First ink | w1 | w2 | w3 | w4 | w5 | w6 | w7 | W1 | W2 | W3 | W4 |
| Abrasion resistance | 2 | 2 | 1 | 1 | 2 | 1 | 2 | 1 | 2 | 2 | 2 |
| Agglomeration unevenness | 2 | 2 | 1 | 1 | 2 | 1 | 2 | 1 | 2 | 2 | 2 |

|  | Comparative Examples | | | | | | | | | | |
|---|---|---|---|---|---|---|---|---|---|---|---|
|  | 56 | 57 | 58 | 59 | 60 | 61 | 62 | 63 | 64 | 65 | 66 |
| Second ink | c6 | c6 | c6 | c6 | c6 | c6 | c6 | c6 | c6 | c6 | c6 |
| First ink | w1 | w2 | w3 | w4 | w5 | w6 | w7 | W1 | W2 | W3 | W4 |
| Abrasion resistance | 2 | 2 | 1 | 1 | 2 | 2 | 2 | 1 | 2 | 2 | 2 |
| Agglomeration unevenness | 2 | 2 | 1 | 1 | 2 | 2 | 2 | 1 | 2 | 2 | 2 |

|  | Comparative Examples | | | | | | | | | | |
|---|---|---|---|---|---|---|---|---|---|---|---|
|  | 67 | 68 | 69 | 70 | 71 | 72 | 73 | 74 | 75 | 76 | 77 |
| Second ink | c7 | c7 | c7 | c7 | c7 | c7 | c7 | c7 | c7 | c7 | c7 |
| First ink | w1 | w2 | w3 | w4 | w5 | w6 | w7 | W1 | W2 | W3 | W4 |
| Abrasion resistance | 2 | 2 | 1 | 1 | 2 | 1 | 2 | 1 | 2 | 2 | 2 |
| Agglomeration unevenness | 2 | 2 | 1 | 1 | 2 | 1 | 2 | 1 | 2 | 2 | 2 |

TABLE 5

|  | Comparative Examples | | | | | | | Examples | | | |
|---|---|---|---|---|---|---|---|---|---|---|---|
|  | 78 | 79 | 80 | 81 | 82 | 83 | 84 | 1 | 2 | 3 | 4 |
| Second ink | C1 | C1 | C1 | C1 | C1 | C1 | C1 | C1 | C1 | C1 | C1 |
| First ink | w1 | w2 | w3 | w4 | w5 | w6 | w7 | W1 | W2 | W3 | W4 |
| Abrasion resistance | 2 | 2 | 1 | 1 | 2 | 1 | 2 | 3 | 3 | 3 | 3 |
| Agglomeration unevenness | 2 | 2 | 1 | 1 | 2 | 1 | 2 | 2 | 2 | 3 | 3 |

|  | Comparative Examples | | | | | | | Examples | | | |
|---|---|---|---|---|---|---|---|---|---|---|---|
|  | 85 | 86 | 87 | 88 | 89 | 90 | 91 | 5 | 6 | 7 | 8 |
| Second ink | C2 | C2 | C2 | C2 | C2 | C2 | C2 | C2 | C2 | C2 | C2 |
| First ink | w1 | w2 | w3 | w4 | w5 | w6 | w7 | W1 | W2 | W3 | W4 |
| Abrasion resistance | 2 | 2 | 1 | 1 | 2 | 1 | 2 | 3 | 3 | 3 | 3 |
| Agglomeration unevenness | 2 | 2 | 1 | 1 | 2 | 1 | 2 | 2 | 2 | 3 | 3 |

|  | Comparative Examples | | | | | | | Examples | | | |
|---|---|---|---|---|---|---|---|---|---|---|---|
|  | 92 | 93 | 94 | 95 | 96 | 97 | 98 | 9 | 10 | 11 | 12 |
| Second ink | C3 | C3 | C3 | C3 | C3 | C3 | C3 | C3 | C3 | C3 | C3 |
| First ink | w1 | w2 | w3 | w4 | w5 | w6 | w7 | W1 | W2 | W3 | W4 |
| Abrasion resistance | 2 | 2 | 2 | 2 | 2 | 2 | 2 | 3 | 3 | 3 | 3 |
| Agglomeration unevenness | 2 | 2 | 2 | 2 | 2 | 2 | 2 | 2 | 2 | 3 | 3 |

|  | Comparative Examples | | | | | | | Examples | | | |
|---|---|---|---|---|---|---|---|---|---|---|---|
|  | 99 | 100 | 101 | 102 | 103 | 104 | 105 | 13 | 14 | 15 | 16 |
| Second ink | C4 | C4 | C4 | C4 | C4 | C4 | C4 | C4 | C4 | C4 | C4 |
| First ink | w1 | w2 | w3 | w4 | w5 | w6 | w7 | W1 | W2 | W3 | W4 |
| Abrasion resistance | 2 | 2 | 2 | 2 | 2 | 2 | 2 | 3 | 3 | 3 | 3 |
| Agglomeration unevenness | 2 | 2 | 2 | 2 | 2 | 2 | 2 | 2 | 2 | 3 | 3 |

TABLE 5-continued

| | Examples | | | | | | | |
|---|---|---|---|---|---|---|---|---|
| | 17 | 18 | 19 | 20 | 21 | 22 | 23 | 24 |
| Second ink | C5 | C5 | C5 | C5 | C6 | C6 | C6 | C6 |
| First ink | W5 | W6 | W7 | W8 | W5 | W6 | W7 | W8 |
| Abrasion resistance | 3 | 3 | 3 | 3 | 3 | 3 | 3 | 3 |
| Agglomeration unevenness | 3 | 3 | 3 | 3 | 3 | 3 | 3 | 3 |

| | Examples | | | | | | | |
|---|---|---|---|---|---|---|---|---|
| | 25 | 26 | 27 | 28 | 29 | 30 | 31 | 32 |
| Second ink | C7 | C7 | C7 | C7 | C8 | C8 | C8 | C8 |
| First ink | W5 | W6 | W7 | W8 | W5 | W6 | W7 | W8 |
| Abrasion resistance | 3 | 3 | 3 | 3 | 3 | 3 | 3 | 3 |
| Agglomeration unevenness | 3 | 3 | 3 | 3 | 3 | 3 | 3 | 3 |

3. 3. 3. Results of Evaluation

In Examples 1 to 32, since both the first and second inks contain polyester-modified polydialkylsiloxane, abrasion resistance was excellent in images recorded with either the first or second ink alone as well as in images recorded by applying the second ink onto the first pattern formed with the first ink. In the case where polyester-modified polydialkylsiloxane contained in the first ink was polyester-modified polydialkylsiloxane having a hydroxyl group, a high-quality image having no agglomeration unevenness was formed.

In Comparative Examples 1 to 105, since polyester-modified polydialkylsiloxane was not contained in the first and/or second inks, abrasion resistance was not sufficient in images formed by applying the second ink onto the first pattern formed with the first ink even though images recorded with either the first or second ink alone had excellent abrasion resistance.

The invention should not be limited to the above embodiments and can be further variously modified. For example, the invention may include configurations substantially the same as those of the above embodiments (e.g., configurations having the same functions, processes, and results or configurations having the same advantages and effects). The invention may also include configurations provided by changing non-essential parts of the configurations described in the above embodiments. The invention may also include other configurations which provide the same effects or advantages as those described in the above embodiments. The invention may also include configurations in which an existing technique is added to the configurations described in the above embodiments.

What is claimed is:

1. An ink set for ink jet recording, the ink set comprising:
   a first ink containing a first pigment; and
   a second ink containing a second pigment, wherein
   each of the first and second inks contains polyester-modified polydialkylsiloxane;
   the first pigment is a white pigment or a glitter pigment,
   the second pigment is carbon black or an organic pigment, and
   at least one of the first and second inks contains an amide compound represented by the following general formula (1),

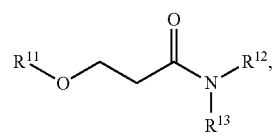

(1)

wherein $R^{11}$ represents an alkyl group having 1 to 4 carbon atoms, and $R^{12}$ and $R^{13}$ each represent a methyl group or an ethyl group.

2. The ink set according to claim 1, wherein each of the first and second inks is a non-aqueous ink.

3. The ink set according to claim 1, wherein at least one of the polyester-modified polydialkylsiloxane contained in the first ink and the polyester-modified polydialkylsiloxane contained in the second ink contains a hydroxyl group.

4. The ink set according to claim 1, wherein at least one of the first and second inks contains a dicarboxylic acid dialkyl ester represented by the following general formula (2) or a polyoxyalkylene glycol compound represented by the following general formula (3),

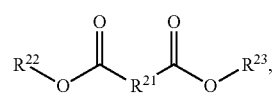

(2)

wherein $R^{21}$ represents an alkylene group having 2 to 5 carbon atoms, and $R^{22}$ and $R^{23}$ each independently represent an alkyl group having 1 to 4 carbon atoms,

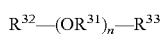

$$R^{32}-(OR^{31})_n-R^{33} \quad (3)$$

wherein $R^{31}$ represents an alkylene group having 2 or 3 carbon atoms, $R^{32}$ and $R^{33}$ each independently represent a hydrogen atom or an alkyl group having 1 to 6 carbon atoms, and n is an integer from 2 to 6.

5. The ink set according to claim 4, wherein the polyoxyalkylene glycol compound represented by the general formula (3) is a diethylene glycol compound represented by the following general formula (4) or a dipropylene glycol compound represented by the following general formula (5),

$$R^{34}-(OC_2H_4)_2-O- \quad (4)$$

wherein $R^{34}$ and $R^{35}$ each independently represent a hydrogen atom, an alkyl group having 1 to 4 carbon atoms, or an $R^{36}CO$ group, and $R^{36}$ is an alkyl group having 1 to 4 carbon atoms, $$R^{37}-(OC_3H_6)_2-O-R^{38} \qquad (5)$$

wherein $R^{37}$ and $R^{38}$ each independently represent a hydrogen atom, an alkyl group having 1 to 4 carbon atoms, or an $R^{39}CO$ group, and $R^{39}$ is an alkyl group having 1 to 4 carbon atoms.

6. A recording method utilizing the ink set for ink jet recording according to claim 1, the method comprising:
  ejecting the first ink; and
  ejecting the second ink.

7. A recording method utilizing the ink set for ink jet recording according to claim 2, the method comprising:
  ejecting the first ink; and
  ejecting the second ink.

8. A recording method utilizing the ink set for ink jet recording according to claim 3, the method comprising:
  ejecting the first ink; and
  ejecting the second ink.

9. A recording method utilizing the ink set for ink jet recording according to claim 4, the method comprising:
  ejecting the first ink; and
  ejecting the second ink.

10. A recording method utilizing the ink set for ink jet recording according to claim 5, the method comprising:
  ejecting the first ink; and
  ejecting the second ink.

* * * * *